April 7, 1942.  A. FIORENTINO  2,278,775
STRESS TRANSMITTING DEVICE
Filed Aug. 31, 1939   3 Sheets-Sheet 1
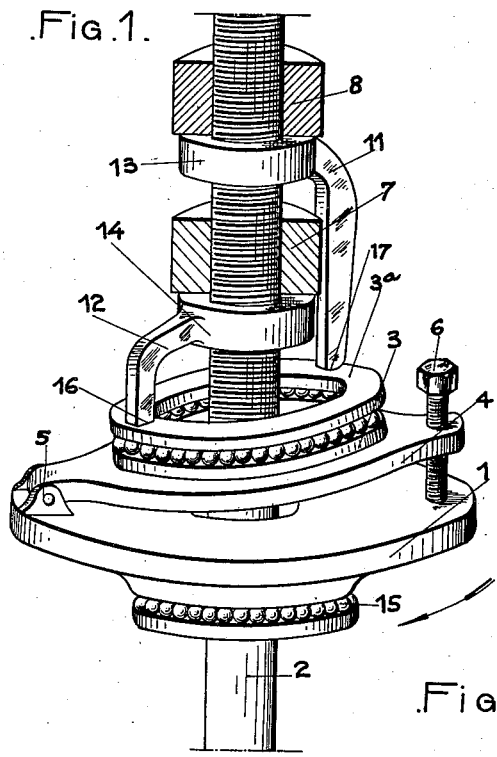
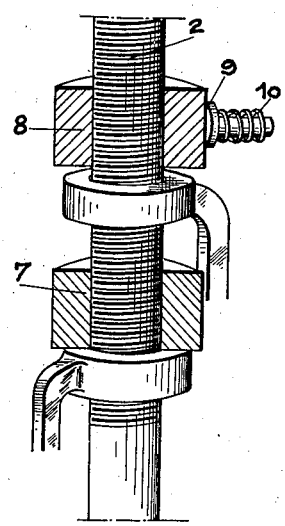
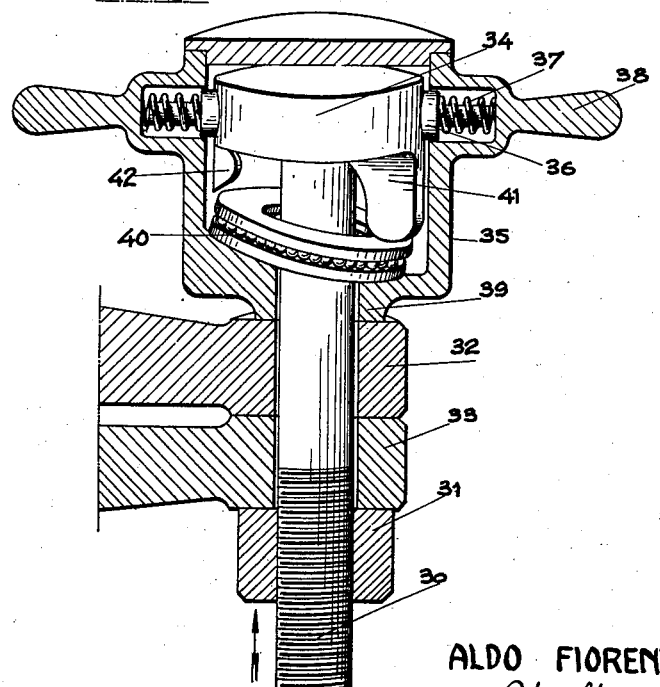
INVENTOR:
ALDO FIORENTINO
BY: Haseltine, Lake & Co.
ATTORNEYS April 7, 1942.  A. FIORENTINO  2,278,775
STRESS TRANSMITTING DEVICE
Filed Aug. 31, 1939    3 Sheets-Sheet 2

INVENTOR:
ALDO FIORENTINO
BY: Haseltine, Lake & Co.
ATTORNEYS

April 7, 1942. A. FIORENTINO 2,278,775
STRESS TRANSMITTING DEVICE
Filed Aug. 31, 1939 3 Sheets-Sheet 3

INVENTOR:
ALDO FIORENTINO
BY: Haseltine, Lake & Co
ATTORNEYS

Patented Apr. 7, 1942

2,278,775

UNITED STATES PATENT OFFICE 2,278,775

STRESS TRANSMITTING DEVICE

Aldo Fiorentino, Paris, France, assignor to Willem Lodewijk Cohen, Bloemendaal-Overveen, Netherlands Application August 31, 1939, Serial No. 292,793

5 Claims. (Cl. 74—57)

The present invention relates, generally speaking, to stress transmitting devices in which a driving member is given a movement of rotation and acts, through the medium of inclines having a suitable slope relatively to the axis of the movement of rotation, for determining the displacements of a driven member according to said axis.

More particularly, the invention concerns devices of the above mentioned type in which the driven member is a screw on which are mounted two nuts which press, through the medium of balls on the inclines of the driving member and which are frictionally connected to said driving member. The latter, by rotating acts for pushing one of the nuts by causing the screw to advance according to the height of one incline, whereas the other nut rotates on the screw so as to be subjected to the action of another incline. Both nuts are thus alternately pushed and rotated and the screw advances continuously without it being necessary to overcome the considerable friction which is produced between the screw threads when use is made as stress transmitting device of an ordinary screw and nut system. A device having inclines and a double nut is described in the United States Patent No. 2,151,094.

The first object of the invention is to simplify the construction of devices of this kind in order to reduce the cost price, and to further extend the field of the applications of the same.

Another object of the invention consists in allowing the transmission ratio of the stress transmitting device, that is to say the ratio between the angle of rotation of the driving member and the corresponding axial displacement of the driven member to be varied.

The invention has also for object to provide a stress transmitting device applicable to clamping screws such as, in particular, vices, and in which the driving member is connected to the screw by friction so as to rotatively drive the same until it encounters a definite resistance, the driving member then acting by means of an incline and through the medium of balls for axially moving the screw.

According to the invention, the stress transmitting device is provided with only one incline constituted by a circular ball-race arranged in a plane inclined relatively to its axis of rotation and bearing, by means of balls or rollers on a similar ball-race through which the axial thrust on the driven member is transmitted.

According to an advantageous peculiarity of the invention, both ball-races above mentioned belong to the rings of an axial ball abutment found on the market.

The accompanying drawings illustrate, by way of example only, embodiments for carrying the invention into practice.

Fig 1 is a diagrammatic perspective view with partial sections of a first embodiment of a stress transmitting device according to the invention.

Fig. 2 is a view of a corresponding detail.

Fig. 4 is a perspective view of a clamping screw device according to the invention.

Figure 3:
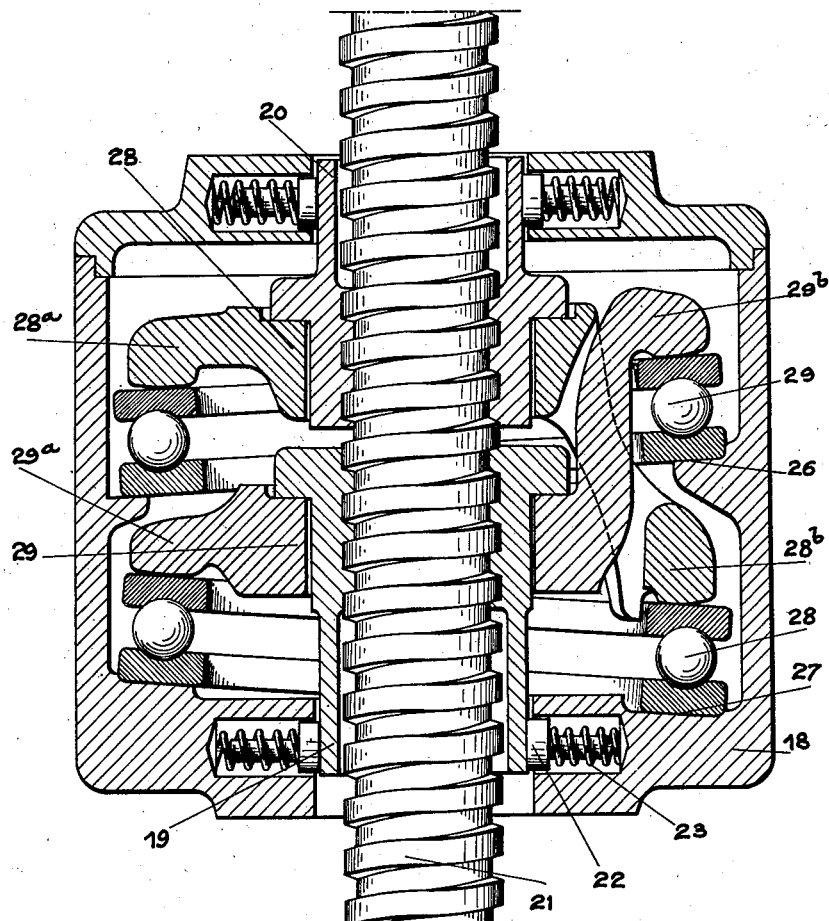
Fig. 3 is an axial section of a second embodiment for carrying the invention into practice.

In the embodiment of Figs. 1 and 2, the stress transmitting device comprises a driving member constituted by an element 1 which can be rotatively driven, by any suitable control means, about the theoretical axis of a screw 2 which constitutes the driven member to be moved in axial translation.

An ordinary ball abutment is secured by means of one of its rings 3 on a sole member 4 pivoted at 5 on the member 1 and the inclination of which relatively to the axis of the screw 2 can be varied by means of a screw 6 screwed on said sole member and abutting at its end, on the member 1.

Two nuts 7 and 8 are screwed on the screw 2 and are free in the axial direction relatively to the member 1, but united to the latter in the angular direction by friction. For that purpose, the member 1 can rotatively drive with it, a frame, not shown, which carries friction shoes 9 pressed by means of springs 10 against the outer cylindrical surface of the nuts 7 and 8 (Fig. 2).

At two diametrally opposed points, the ring 3ª of the inclined ball abutment carries rods 11 and 12 which are terminated by heads 13 and 14 respectively pressing against the lower faces of the nuts 8 and 7. Said heads, in the example diagrammatically illustrated in the drawings are constituted by sleeves through which the screw 2 passes with an important clearance.

The operation of the device is as follows:

The member 1 being supported in the axial direction by a ball abutment 15 is rotatively driven with a continuous movement in the direction of the arrow; the point 16 rises up to the height of the point 17 during a half-revolution and the nut 7 is raised with the screw 2 relatively to which it does not rotate owing to the considerable friction between the screw threads. The friction shoe, such as 9 (Fig. 2) slides on the nut 7, whereas the nut 8 is rotatively driven with the member 1 and lowers along the screw, being supported in the axial direction solely by the nut 7. At the following half-revolution, the point 17 rises and the point 16 lowers, and the movements described are repeated alternately for the nuts 7 and 8 by axially displacing the screw to the extent of twice the difference of level between the points 16 and 17 for one revolution of the member 1. This difference of level is adjusted by the screw 6 and determines the value of the ratio between the torque exerted on the member 1 and the axial load applied on the screw 2. As will be seen, no friction takes place between the threads of the screw and of the nut which supports the load.

In the embodiment of Fig. 3, the driving member is constituted by a drum 18 connected to two nuts 19 and 20 mounted on the screw 21, by friction shoes 22 restored in position by springs 23. Two ball abutments 24 and 25 press on bearings 26 and 27 of the drum and are reversely inclined but according to the same angle, relatively to the axis of the screw 21.

The nuts 19 and 20 rest on sleeves 28 and 29 which are equivalents of the sleeves 13 and 14 of Figs. 1 and 2 and which are provided with noses 28ª, 28ᵇ and 29ª, 29ᵇ. The noses 28ª and 28ᵇ of sleeve 28 respectively bear on the abutments 24 and 25 at the low point of the latter; the noses 29ª and 29ᵇ of sleeve 29 press on the same abutments, but at the high point. For that purpose, the noses 28ᵇ and 29ᵇ are arranged at the ends of arms one of which freely passes through a recess formed in the other, as shown.

The operation of this device is substantially that of the diagrammatic embodiment of Figs. 1 and 2, but the reactions applied on the driving member 18 are distributed on either side of the axis of the whole structure since the sleeve which is pushed simultaneously presses on two diametrally opposed points. Thus, when the sleeve 28 is pushed, it presses through the nose 28ª on the ball abutment 24 and through the nose 28ᵇ on the ball abutment 25, the reactions at the bearing points having a resultant direction according to the axis of the screw 21.

The device of Fig. 4 shows the application of the invention to a device clamping by means of a screw and nut. A screw 30 is screwed in a nut 31 and freely passes through two members 32 and 33 which are to be brought together by clamping. The head 34 of the screw is cylindrical and connected to a drum 35 by friction shoes 36 restored by springs 37. The drum 35, operated for instance, by hand by means of wings 38, presses by its base 39 on the member 32, whereas the nut 31 presses on the member 33. An ordinary ball abutment 40 is mounted coaxially to the screw 30 on an inclined bearing of the drum 35 and presses, through its upper ring on a finger or extension 41 of the head 34 of the screw.

The operation of the device is as follows:

The two members 32 and 33 being spaced from each other, to bring them together, the drum 35 is rotated. As long as the resistance to the bringing together has not reached a sufficient value, the screw 30 rotates with the sleeve by screwing in the nut 31. When the two members 32 and 33 are in contact, the shoes 36 slide on the head 34 and the finger 41 drives the upper ring of the ball abutment 40 by exerting on the screw 30 an axial thrust in the direction of the arrow. The locking of the members 32 and 33 is ensured with the stress transmission ratio determined by the inclination of the ball abutment 40 and without losses by friction, since the threads of the screw 30 and of the nut 31 have no relative movement, and since the displacement of the upper ring of the ball abutment 40 relatively to the drum 35 only gives rise to extremely reduced rolling frictions.

An abutment 42 is provided on the drum 35 for preventing the finger 41 from passing beyond the high point of the ball abutment 40.

Figure 5:
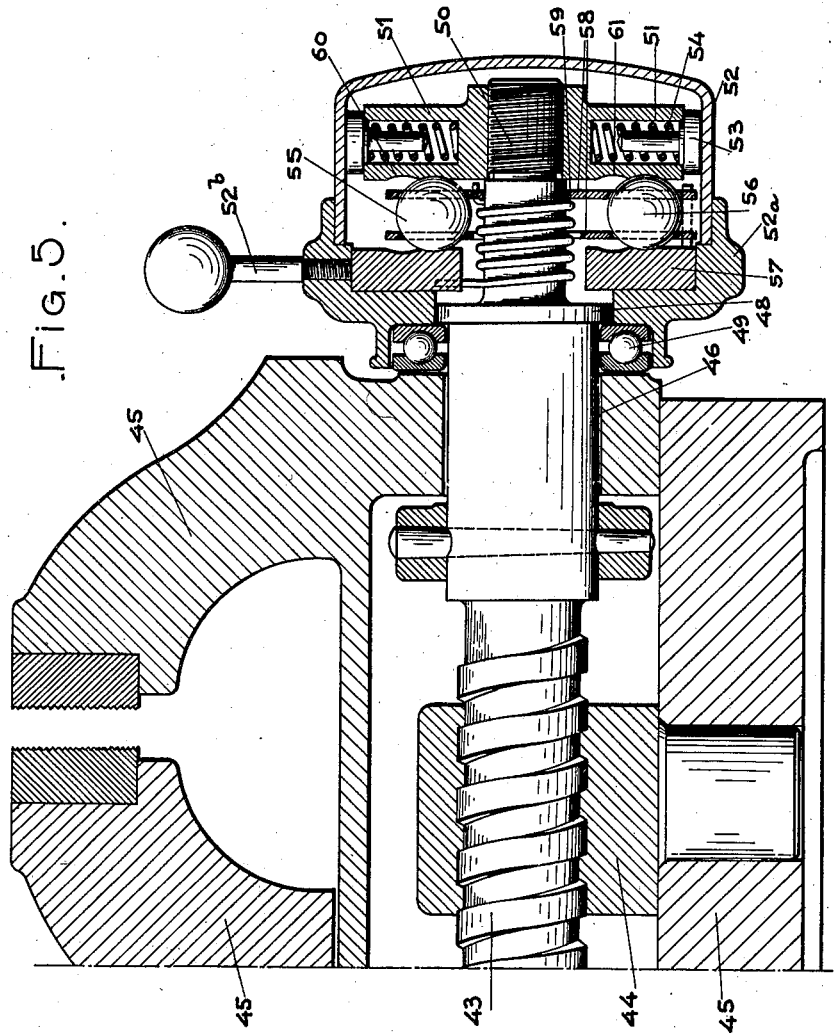
Fig. 5 is an axial section of a vice provided with a clamping device according to the invention.

The principle of this device is applied in the embodiment of Fig. 5 to a vice having a rapid clamping action.

The screw 43 of the vice is screwed in the nut 44 of one of the jaws 45 and freely passes through a bore 46 formed in the other jaw 47. This screw 43 presses through its collar 48 on the jaw 45 through the medium of a ball abutment 49; it is extended at 50 and receives a plate 51 rigidly and suitably secured thereon, said plate being connected to a drum 52 by means of friction shoes 53 restored by springs 54. This drum is centered relatively to the screw 43 by means of the collar 48 and axially abuts through the ball abutment 49 as shown; it carries a short operating lever 52ᵇ.

The front face of the plate 51 is provided with two circular grooves co-axial with the screw 43 and the bottoms of which are inclined so as to form inclines, one of which presses, through a ball 55, and the other through a ball 56, on a ball race 57 mounted on the bottom of the drum 52 which, for convenience of assemblage can be made in two parts 52 and 52ª, as shown. The balls 55 and 56 are guided in a cage 58 connected by a spring 59 to the ball race 57.

The operation is as follows:

For spacing apart the jaws 43 and 45 or for bringing them together until they encounter a resistance determined by the friction of the shoes 53 on the drum 52, the latter is rotated in one direction or in the other, rotatively driving the screw relatively to the nut 44. When, by clamping, the jaws have taken contact with the member to be clamped, the shoes 53 slide on the drum 52 and the screw 43 ceases to rotate; the inclines 60 and 61 then intervene for ensuring the locking without resisting to the friction, in the same conditions as for the case of Fig. 4. A powerful locking can be ensured by exerting a relatively reduced effort on the operating lever 52ᵇ. The unlocking is ensured by a slight angular displacement of the drum 52, the balls being restored to the low points of the inclines by the spring 58. As soon as the unlocking is ensured, the drum 52 and the screw 43 can rotate as a single unit for spacing the jaws of the vice apart to the desired amount. The operation of a vice arranged as just described, does not necessitate important efforts; for this reason, it is extremely rapid and without fatigue for the user.

What I claim as my invention and desire to secure by Letters Patent is:

1. In a stress transmitting device, a rotatively movable driving member, a driven member consisting of a screw co-axial with said driving member, a ball race arranged in a plane inclined relatively to the axis common to the driving and driven members, a ball abutment also disposed in a plane inclined to said axis and rotatable with said driving member at least one ball in contact with said ball race and ball abutment, and means interposed between said ball race and said driven member for converting the rotations of the driving member into axial translations of the driven member.

2. In a stress transmitting device, a rotatively movable driving member, a driven member consisting of a screw co-axial with said driving member, two nuts screwed on said screw, means for frictionally connecting said nuts and the driving member, a ball abutment facing a portion of said driving member and inclined relatively to the axis of the screw, and means for axially connecting said nuts and the high and low points of the ball abutment so that the rotations of the driving member are converted into axial thrusts alternately exerted on the nuts.

3. In a stress transmitting device, a driving member adapted to be rotatively driven, a driven member consisting of a screw co-axial with the driving member, two nuts screwed on said screw, means for frictionally connecting said nuts to the driving member, a plate pivoted on said driving member, means for varying the inclination of said plate relatively to the axis of the screw, a ball abutment secured on said plate, and means interposed between the nuts and the high and low points of said ball abutment for converting the rotation of the driving member into thrusts alternately exerted on said nuts.

4. In a stress transmitting device, a driving member so arranged as to be rotatively driven, a driven member consisting of a screw co-axial with the driving member, two nuts screwed on said screw, means for frictionally connecting said nuts and said driving member two ball abutments inclined according to the same angle, but in two opposite directions, relatively to the axis of the screw, and taking a bearing on the bearings of the driving member, and two sleeves interposed between each of the nuts and said ball abutments and adapted to press, one on the low points of both ball abutments and the other on the high points of both said ball abutments, so as to convert the rotations of the driving member into thrusts exerted alternately on said nuts.

5. In a stress transmitting device for clamping two members by bringing them together, a screw passing through said members, a nut screwed on said screw and pressing on one of the members, a driving member adapted to rotate co-axially with said screw and to press on the other member, means for frictionally connecting the screw and said driving member, and a ball abutment inclined relatively to the axis of the screw and interposed in the axial direction between the driving member and said screw, so that the screw rotates with the driving member as long as the members to be clamped are not in contact, and is pushed in the axial direction without rotating when said members are in contact.

ALDO FIORENTINO.